H. GOERLITZ.
ADDING AND SORTING MACHINE.
APPLICATION FILED JULY 19, 1915.
1,223,690.
Patented Apr. 24, 1917.
11 SHEETS—SHEET 1.
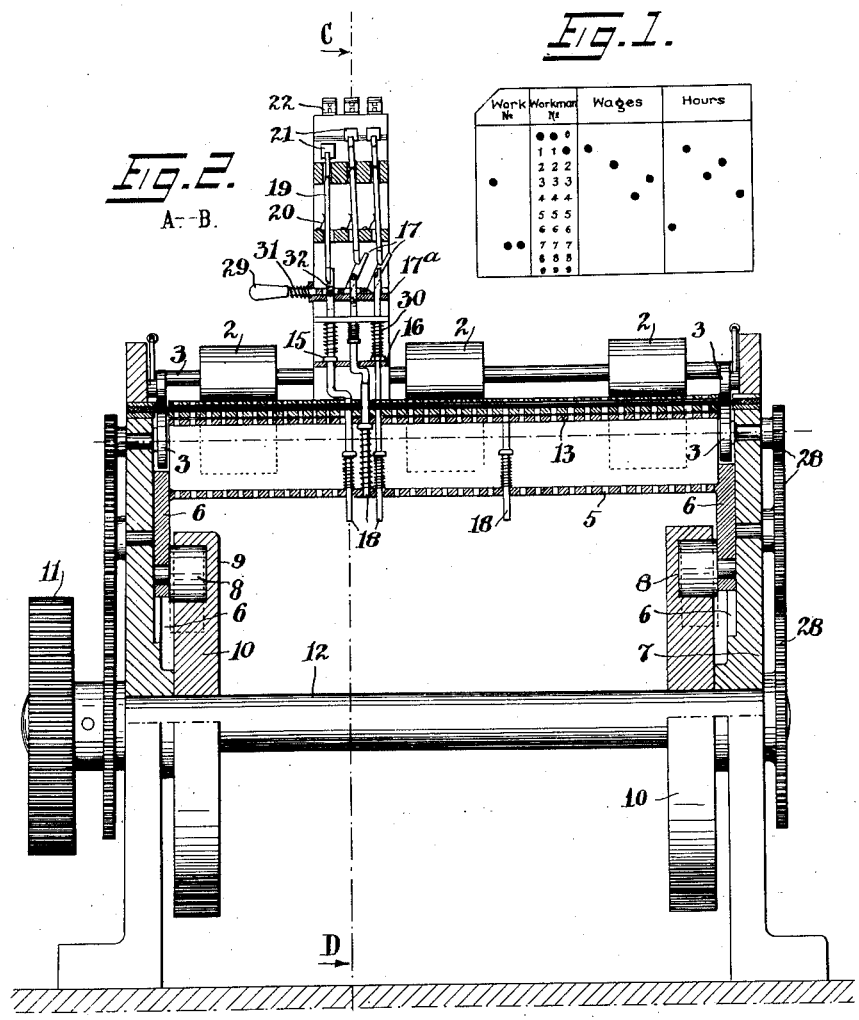
Witnesses:
Inventor:
Hans Goerlitz.
By his Atty:

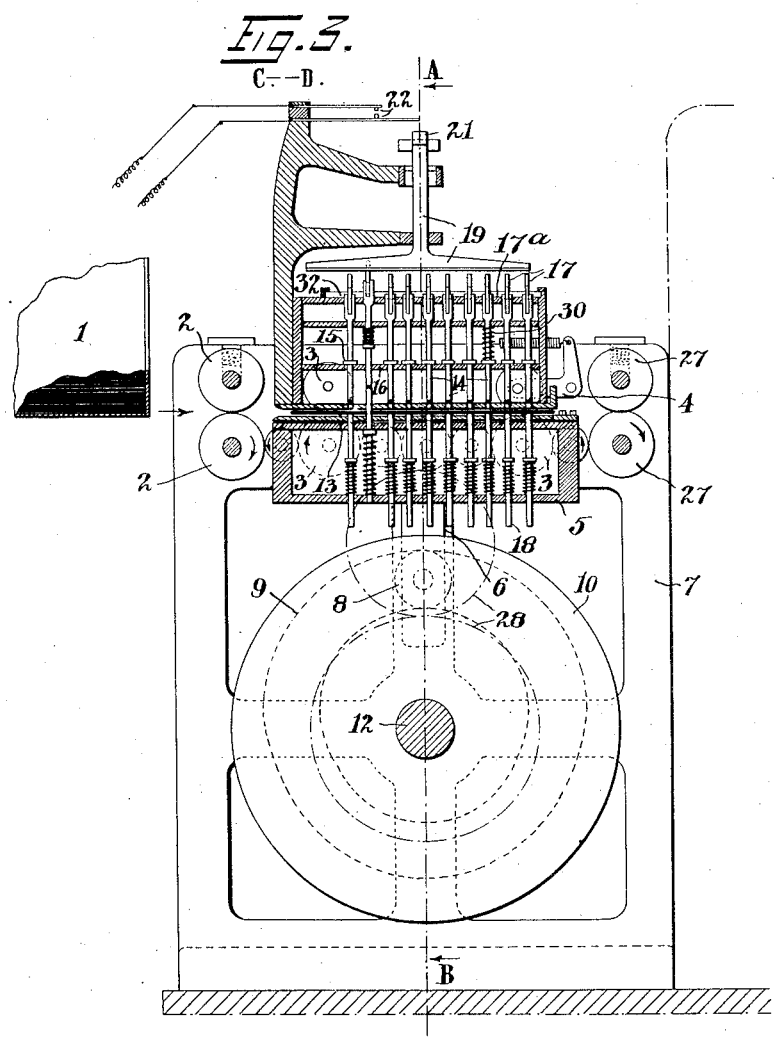

H. GOERLITZ.
ADDING AND SORTING MACHINE.
APPLICATION FILED JULY 19, 1915.
1,223,690.
Patented Apr. 24, 1917.
11 SHEETS—SHEET 3.
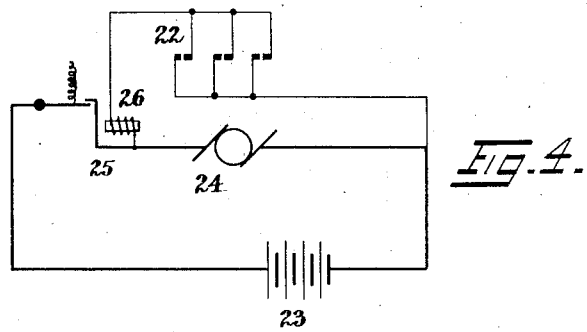
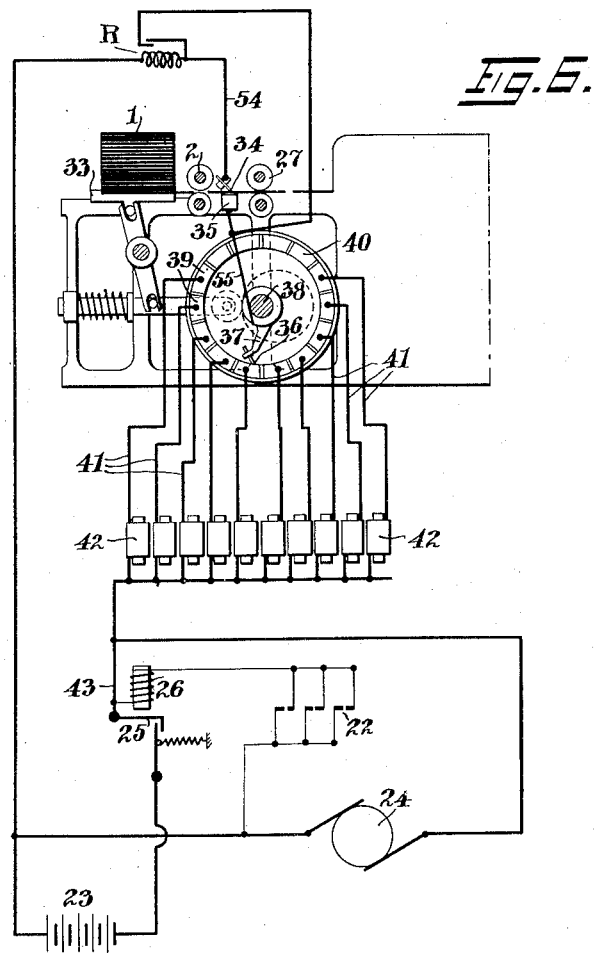
Witnesses:
Chas. E. Whiteman
H. D. Penny
Inventor:
Hans Goerlitz.
By his Att'y: F. H. Richards

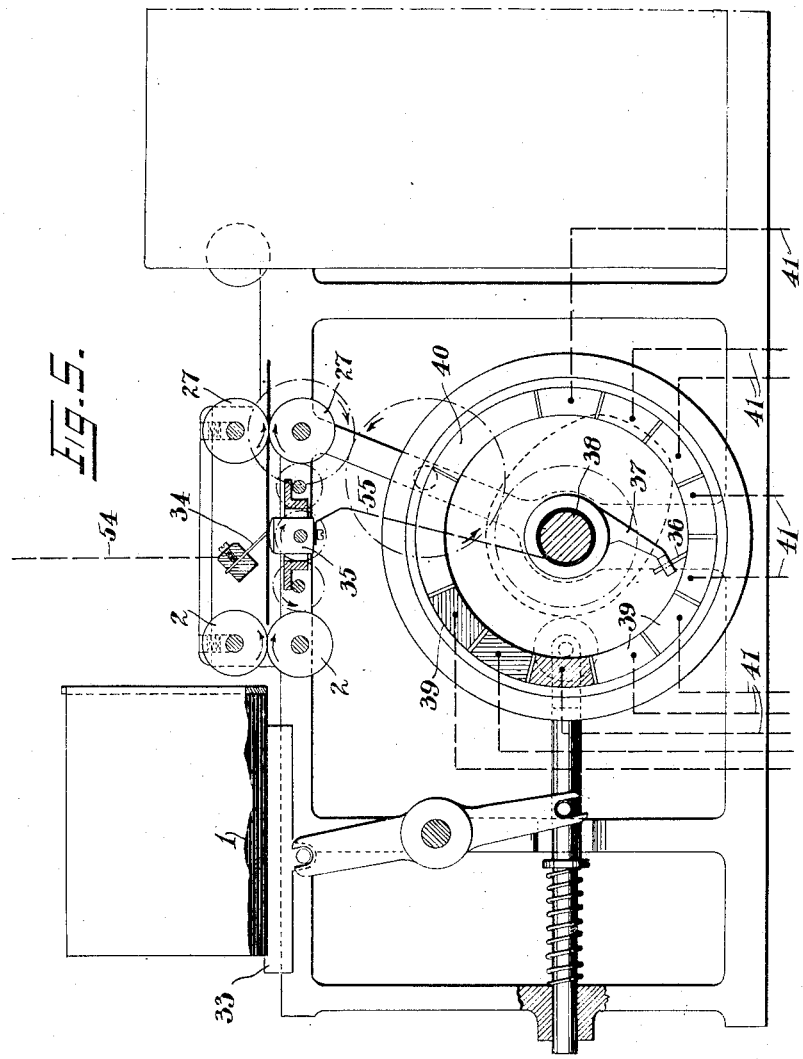

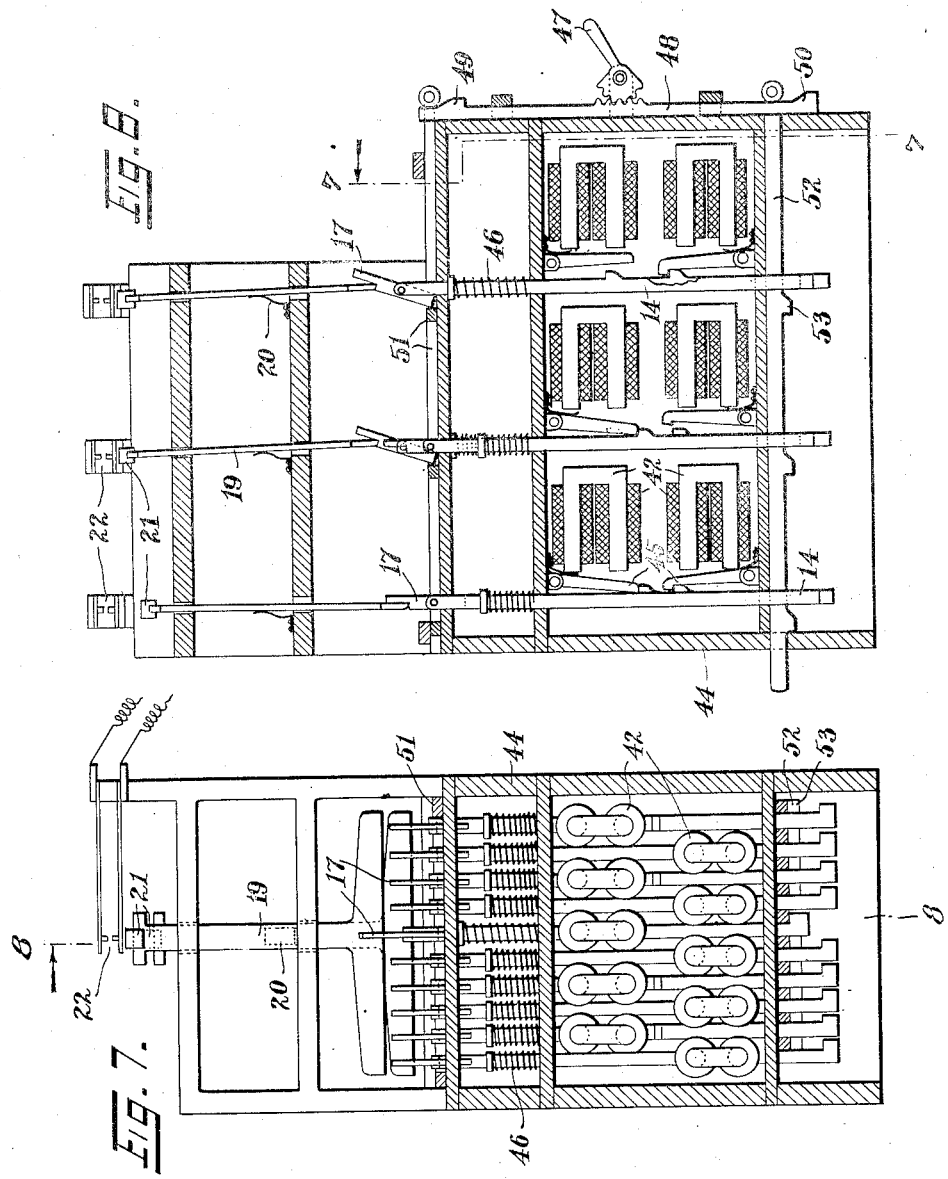

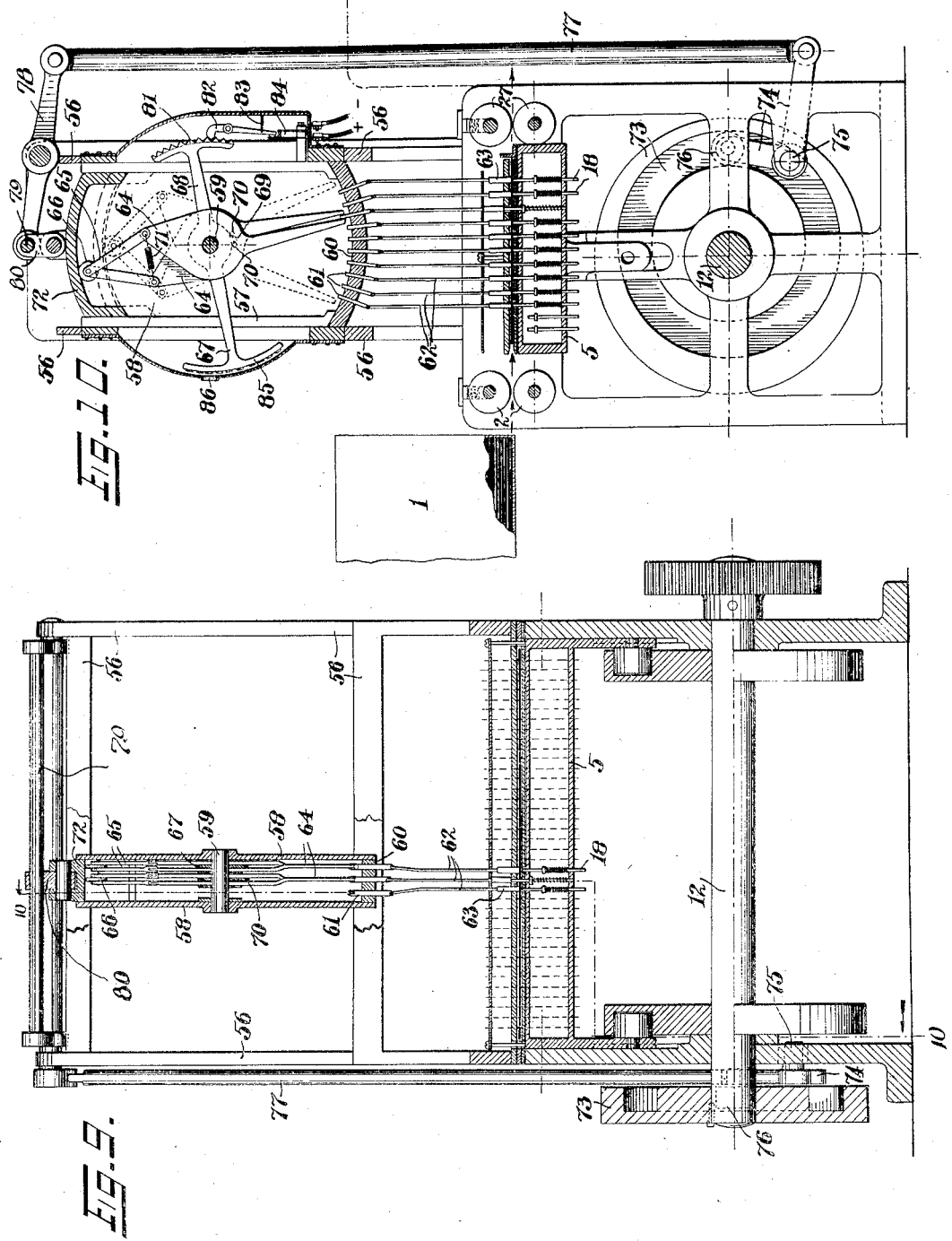

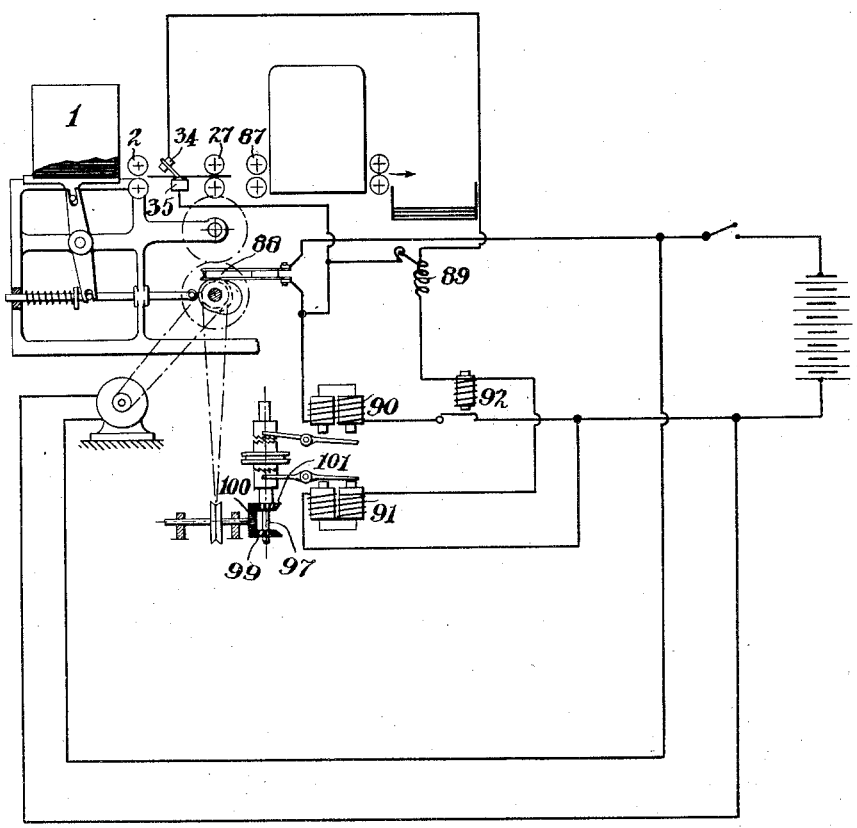

H. GOERLITZ.
ADDING AND SORTING MACHINE.
APPLICATION FILED JULY 19, 1915.

1,223,690.

Patented Apr. 24, 1917.
11 SHEETS—SHEET 8.

Witnesses:
Chas. E. Whiteman
J. D. Penney

Inventor:
Hans Goerlitz.
By his Atty: J. H. Richards

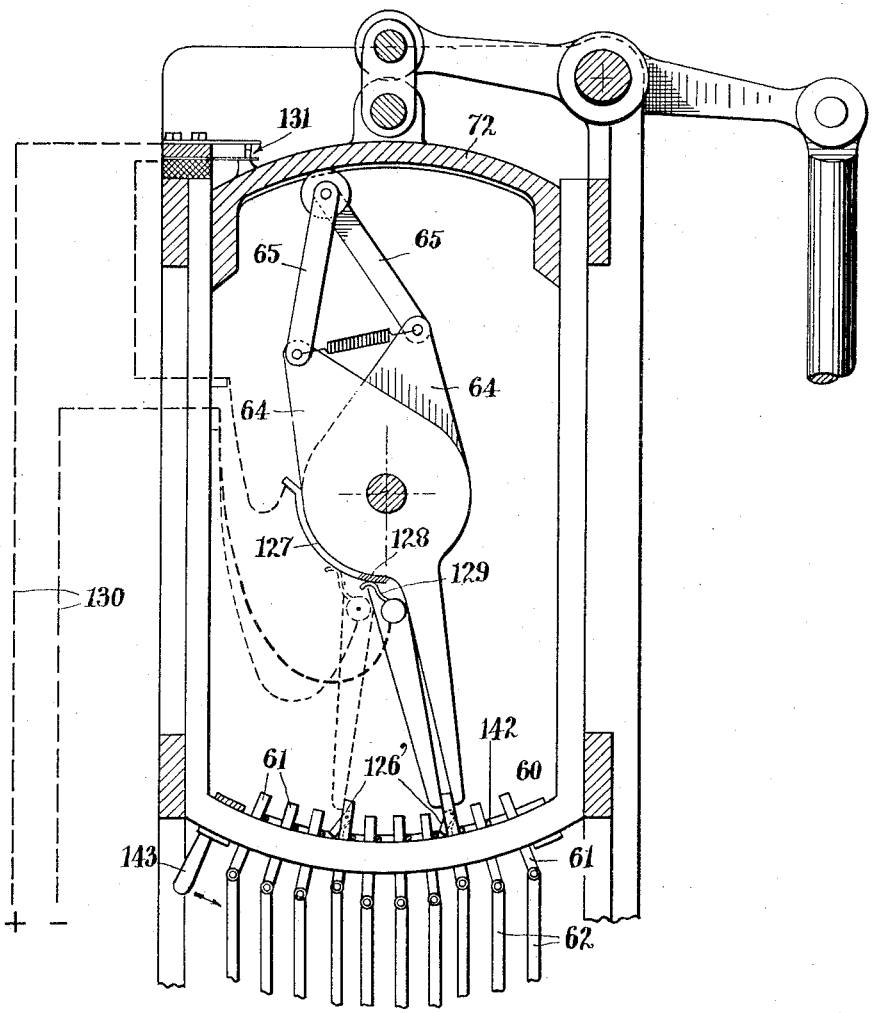

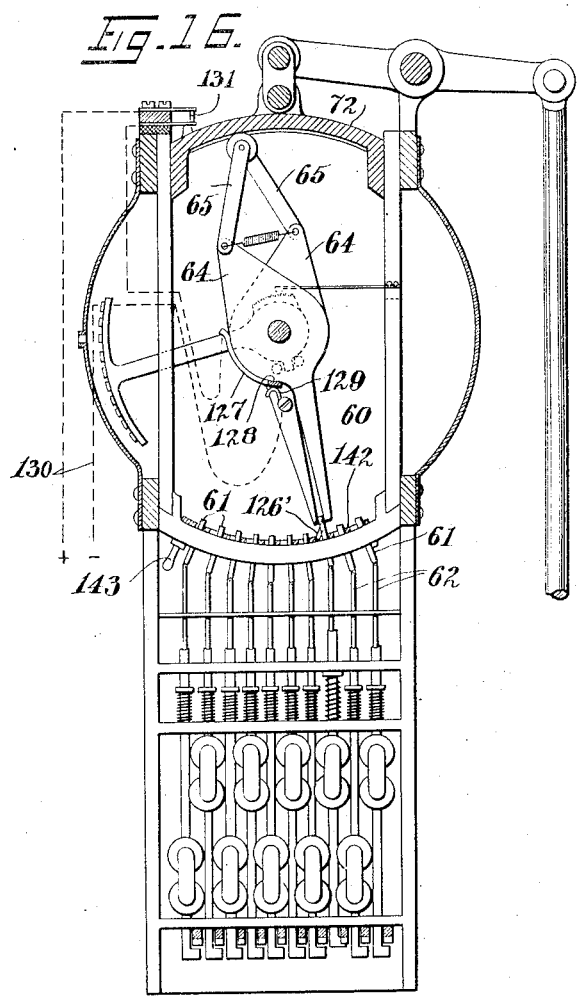

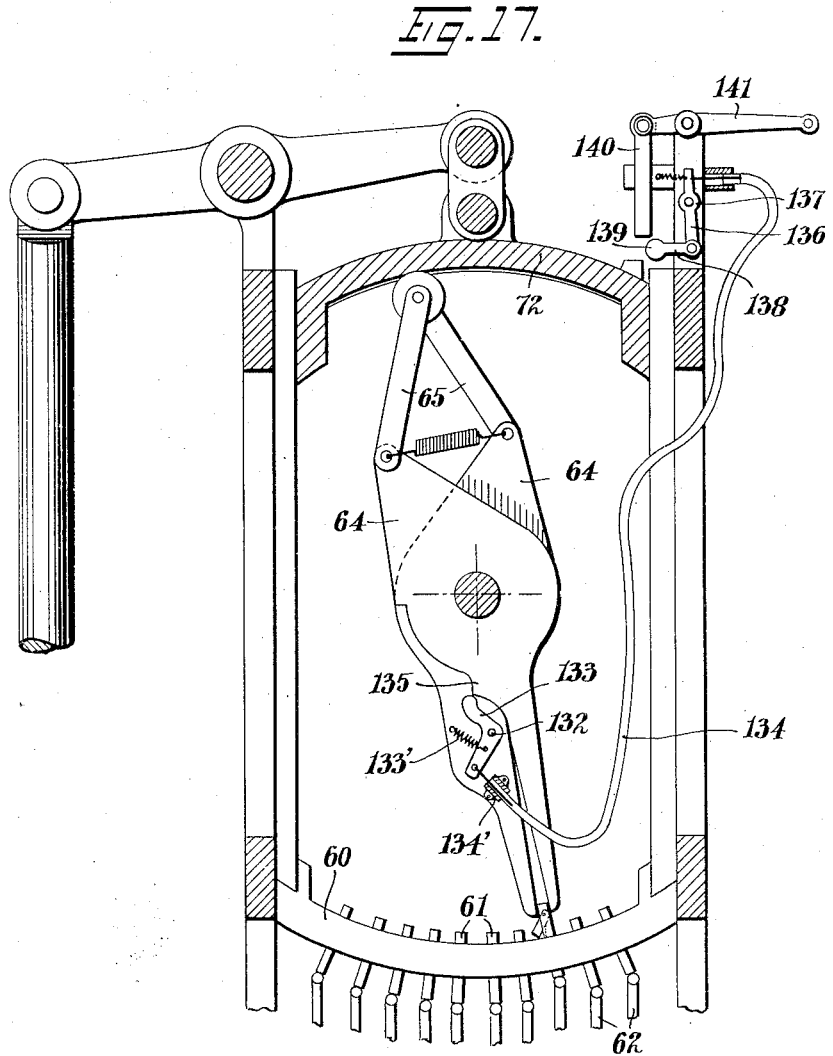

UNITED STATES PATENT OFFICE.

HANS GOERLITZ, OF BERLIN, GERMANY, ASSIGNOR TO POWERS ACCOUNTING MACHINE COMPANY, OF NEW YORK, N. Y., A CORPORATION OF DELAWARE.

ADDING AND SORTING MACHINE.

1,223,690.   Specification of Letters Patent.   Patented Apr. 24, 1917.

Application filed July 19, 1915. Serial No. 40,700.

*To all whom it may concern:*

Be it known that I, HANS GOERLITZ, engineer, a subject of the Emperor of Germany, residing at Potsdamerstrasse 75, Berlin, W. 57, Germany, have invented certain new and useful Improvements in Adding and Sorting Machines, of which the following is a specification.

This invention relates to adding or sorting machines and more particularly to mechanism for automatically stopping such sorting machines.

Machines operating with perforated cards are used for statistical purposes. According to their positions, the perforations in the cards represent certain definite data, and the cards are sorted in the machines according to such data, or else the different data are added up, subsequent to the sorting.

When using machines of this description, it often becomes necessary to suspend their operation automatically, whenever a predetermined number of similar cards, *i. e.* of cards belonging to the same group, has passed through the machine. To this end it has heretofore been customary to feed only cards belonging to one such group into the machine, or else to feed a number of different groups simultaneously into the same, but to separate the individual groups from each other by means of cards of distinctive shape, and with special perforations, known as "stop cards." It is the purpose of this present invention to obviate the necessity of using such stop cards, as well as of feeding only one group of cards into the machine. The insertion of the stop cards, more particularly, which was generally done by hand, was not only a tedious task, but also a frequent and serious source of errors, since the omission of a stop card, or its insertion in a wrong place, naturally vitiated the result obtained from the preceding or following group of cards. Moreover, the expense of inserting the stop cards by hand, in cases requiring the handling of numerous small groups of cards, was liable to render the use of such machines, and particularly of adding machines, less profitable, since the inserting of the stop cards frequently occupied more time, than the adding operation proper.

All of the said disadvantages are obviated by the contrivance to which this present invention has reference, inasmuch as it stops the adding machine automatically, without the use of stop cards, at the instant when the first card of the next following group is about to be fed into the adding machine.

These and other features, capabilities and advantages of the invention will appear from the subjoined detail description of the preferred embodiments thereof illustrated in the accompanying drawings in which—

Figure 1 shows a card adapted to be used in machines equipped with the present improvements.

Fig. 2 is a fragmental elevation partly in section along the line A—B of Fig. 3 showing a form of the invention which performs the work by mechanical means.

Fig. 3 is a fragmental elevation partly in section along the line C—D of Fig. 2 showing the form of the invention illustrated in Fig. 2.

Fig. 4 is a diagrammatic view showing the switch disconnecting means to be actuated by the stopping means illustrated in Figs. 2 and 3.

Fig. 5 is a fragmental elevation partly in section showing the form of the invention which performs the work by electrical means.

Fig. 6 is a diagrammatic view showing the switch disconnecting means connected to the wiring of the electrical stopping means illustrated in Fig. 5.

Fig. 7 is a section along the line 7—7 of Fig. 8 showing part of the mechanism of the electrical stopping means illustrated in Fig. 5.

Fig. 8 is a section along the line 8—8 of Fig. 7 showing another view of the same electrical stopping means illustrated in Fig. 5.

Fig. 9 is a fragmental elevation partly in section showing another form of the invention which performs the work by mechanical means; and Fig. 10 is a fragmental elevation of the same partly in section along the line 10—10 of Fig. 9.

Fig. 11 is a diagrammatic view showing the electrical connections of another form of invention which performs the work by electrical means.

Fig. 15 shows another form of the invention for performing the work by mechanical means.

Fig. 16 is a view similar to Fig. 15 showing the magnets for the pins to be actuated into the path of movement of the shears.

Fig. 17 shows a form of the invention similar to that shown in Fig. 15 but for performing the work by electrical means.

Figure 12:
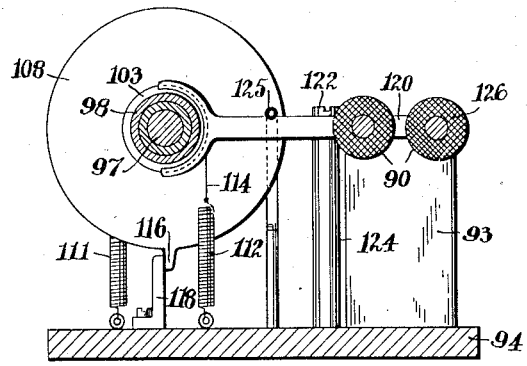
Fig. 12 is a section along the line 12—12 of Fig. 14 showing a part of the electrically actuated mechanism illustrated in Fig. 11.

The following instance may serve for explanatory purposes:

Supposing the total amount of the weekly wages of a number of workmen is to be ascertained. To this end, the cards are first sorted in consecutive order in a sorting machine, according to the numbers of the workmen, in such manner that when the cards are removed from the said sorting machine, the first card will be that of workman No. 1, the second card that of workman No. 2, and so forth. The cards are thereupon fed into the adding machine. In this latter machine, the stop motion which "fingers" the cards prior to their being fed into the adding machine, is started in consequence of the change in perforation, when the last card of group 1 has passed through, and the first card of group 2 is passing the said stop motion. When thus started, the latter operates a disconnecting gear or switch which disconnects the machine as such from the power plant, or cuts off the current from the driving motor. As the stop motion is started by any change in perforation, it will also stop the machine whenever a card with faulty perforation passes through.

The problem involved was solved by the six different methods hereinafter described, to wit:

(1ª). A pin passing through the perforation in the first card of each group, initiates a disconnecting motion which is not followed up as long as cards belonging to the same group and similarly perforated, pass through the machine, the said disconnecting motion being completed, however, as soon as a card with different perforation in the position that differentiates the groups, or, in other words, the first card of a new group, passes into the stop motion.

(2ª). A movable, shear-shaped system of grips or catches is made to approach from two sides the pin that has passed through a perforation, or an extension of such pin, and in the course of this periodically recurring operation it assumes at the conclusion of the closing motion of the shear blades the same final position, as long as the card perforations are in the same position. Whenever the position of the perforation of the corresponding column of the next following card is different, the system of grips or catches will likewise assume a final position differing from that previously assumed by the same, this change being utilized for operating a disconnecting part or switch, for the purpose of breaking the driving circuit.

(3ª). A similar system of shear-shaped grips or catches as in 2ª is provided and closes as long as only one pin has passed through the card. After passing through the card, the pin raises an extension part, and the latter is locked in its upper position. Whenever a card is perforated in a different position in the corresponding column, a second pin will pass through and raises a second extension part. The system of grips or catches which is periodically moved, thereupon attempts to close around the pins that have passed through the card, or rather around the extensions of the same, but as two pins have pasesd through, it is no longer capable of closing around them and therefore assumes a different final, or rather intermediate position. In consequence of the resulting new position of the system of grips or catches, a circuit breaking device is released, similarly as described at 1ª and 2ª.

(1ᵇ, 2ᵇ, 3ᵇ). If electric contacts are substituted for the pins, for fingering the cards while in continuous motion, the three above described solutions of the problem may be correspondingly applied. Three solutions by electricity are consequently to be added to three above specified solutions by mechanical means.

The drawings illustrate the different solutions of the problem in seven modes of construction and 17 figures.

*(Ad 1ª). Solution of problem by mechanical means.*

Fig. 1 shows a card of the kind available for the weekly summing up of the wages of workmen of factory hands. The perforations "0 0 1" appears in the column under the heading "Workman No."

In Fig. 3, the figure 1 indicates the stack of cards, placed in a box or receptacle. A grip or catch of any of the known types of construction draws out the cards separately from the bottom of the stack, and they are then fed by the rollers 2 and 3 into the stop motion, until a stop 4 prevents the further motion of the cards. While the cards are thus in a position of rest, a frame 5, equipped with a number of spring pins 18 is moved in an upward direction. The frame 5 slides in the guides 6 (Fig. 2) of the machine frame 7, and as the rollers 8 attached to the said frame 5 revolve in curved grooves 9 of the pulleys 10, mounted on the main shaft 12, driven by the gear 11, they impart an up and down motion to the frame 5. A number of spring pins 18, equal to the number of figures previously printed on the cards, and resting in holes properly drilled in a guide plate 13, are mounted in the frame 5. When the said frame, equipped with the spring pins 18, is moved in an upward direction while there is a card in the stop motion, pins will pass through the card wherever it is perforated, and these pins are again withdrawn when the frame is on its downward stroke. The device containing the disconnecting gear or switch is mounted above the column of the card, in which the changes in the perforations are to be controlled, and in the case in reference it is consequently mounted above the column headed "Workman No." Three rows of ten pins 14 each are provided and correspond to the three rows of figures in the column headed "Workman No." Under normal conditions, these pins 14 are forced downward by springs, so their collars 15 rest on a plate 16. The upper ends of the pins 14 are forked, a rotary stop lever 17 being mounted in the said forked part. Whenever a pin 18 passes upward through a perforation in the column "Workman No." it will, under the action of its spring forcing it upward, likewise raise the pin 14, mounted above it. During this upward motion, the rod 19, in the shape of an inverted T, is likewise lifted over the same distance. Springs 20 exert lateral pressure upon the rod 19 and force the lower head of the rod against the upper stepped arm of the lever 17, in such manner as to impart to the latter an inclination to turn in the direction of the hands of a watch, as shown in Fig. 2. This turning motion, however, can only be effected when the lower arm of the lever 17 has been lifted out of the upper guide plate 17ª. The lower arm of the lever 17 will then strike over the plate 17ª and prevent the return stroke of the rod or bar 19 and of the raised pin 14. Only the pin 18 has unobstructed downward motion, i. e. it can be moved out of the plane of the card, when the frame 5 is on its downward stroke. Now, if the next following card has a perforation in the same position as the preceding card, the same pin 18 will again pass through the perforation in the card as above described, when the frame 5 is on its next upward stroke, but without raising the previously lifted pin 14 and rod 19 any farther, both of these parts being already in their upper position. When in this position however, the rod 19 does not as yet reach the disconnecting or switch parts of the stop motion, and these latter parts remain consequently inactive, as long as the perforation in the column of the cards that is to be controlled, remains unchanged. When there is subsequently a change in the perforation, i. e. when the last card of "workman No. 1" has passed through the machine, and the first card of "workman No. 2" is fed into the device, the pin mounted next to the previously moved pin 18 will pass through the perforation and raise a second pin 14, superposed to the same. However, although the rod 19 has already been raised by the first card of the preceding group, the said rod 19 is now shifted farther upward, for the following reason:

At the time of its first motion, the rod or bar 19 has shifted into an oblique position under the action of the spring 20, in combination with the turning of the locking lever 17, with the result that the rod or bar 19 is now in position above the higher step of the upper arm of the locking lever 17 which locks all of the new pins 14, mounted in the same row. The bar or rod 19 is consequently in a position in which it can be struck and moved farther upward, when a second pin 14, with its locking lever 17, is raised from the same row of pins. When the rod or bar 19 is thus raised farther, a block 21, mounted on its upper end, strikes against the lower part of an electric circuit closing contact, thereby closing a circuit. The block 21 is so mounted that it can be shifted, for the purpose of providing a means for limiting at will the effect of the individual parts of the stop motion.

Fig. 4 is a sketch showing the connections used for disconnecting the machine. The current source is indicated by 23, while 24 is the motor operating the machine, and 25 an automatic circuit breaker. Whenever one of the contacts 22 is closed by the stop motion, current is sent into the magnet 26 of the circuit breaker 25 and causes the latter to operate. It thereupon breaks the circuit of the motor 24, thereby stopping both the motor and the machine.

When a perforated card has been fingered in the stop motion, it is conveyed farther through the machine by the rollers 3 and the cylinders 27, as soon as the pin frame 5, when on its downward stroke, has carried down the angular stop 4 attached to the same to a sufficient extent to cause it to release the card. The rollers 3, operated by the toothed gear 28, have permanent rotation, but slide over the card without any effect, as long as the latter is held in place by the stop.

A handle 29 is provided for setting the device back into the starting position, after the machine has been disconnected. When the said handle is pushed inward, a system of rods, crossing each other, and attached to the same, throws the levers 17, whose arms are turned down, back into their vertical position, thereby causing the springs to pull back into their starting position all such parts as were still locked in their raised positions by the said levers. A spring 31 thereupon again forces the system of crossed rods, and the handle attached to the same, toward the outside, all the machine parts being consequently in position for a further operation.

The frame in which the connecting gear parts are mounted may be so arranged, of course, that it can be shifted transverse to the direction in which the cards are fed through the machine, so that any of the columns on the cards may be connected at will with the stop motion.

(Ad 1b). *Solution of problem by electricity.*

According to Fig. 5, the cards are taken separately from the card stack 1 by a grip or catch 33, and conveyed into the adding machine by means of pairs of rollers 2 and 27. During this motion, the card passes the sliding back contact 34 and a stationary contact piece 35, belonging thereto. This causes the closing of a circuit at different instance, the time being dependent on the position of the perforation in the card. The number of brushes provided is equal to the number of vertical columns of figures on the card column to be controlled. Three sliding contacts 34, with the contact pieces 35 belonging thereto, are consequently required for handling the card shown in Fig. 1, which is to cause the machine to operate whenever there is a change in the perforation in the column headed "Workman No.".

A contact brush 36, mounted in a rotary arm 37, the latter being mounted in turn on a shaft 38, slides synchronically with the motion of the card, completing one circular motion during the period required for causing each of the cards to pass through. During this circular motion, the contact brush 36 slides over ten contacts 39 insulated in their bearings, in such manner that it performs its sliding motion or stroke over the contact pieces in the same time and measure in which the brush 34 progresses along the vertical columns of figures on the cards. An insulating piece 40 is inserted in the series of contacts 39, and brush 36 slides over the said insulating piece as long as there is no card under the brush 34. The number of rings, made up of contact pieces 39 and insulating pieces 40, is equal to the number of brushes 34.

Each of the contact pieces 39 is connected by a separate electric conductor 41 with one of the poles of the electro-magnets 42 (Fig. 6), while the other poles of the latter are connected with the current source 23 by a joint conductor 43, into which is switched an automatic circuit breaker 25. A relay R is provided for the purpose of keeping the circuit closed for a period longer than that during which it can be closed by means of the contact made through the perforation. The magnets 42 are mounted in a frame 44 (Figs. 7, 8). Their armatures 45 are constructed in the shape of pawls, and each of these pawls retains a rod 14, which rods correspond exactly to the rods 14 provided in the mode of construction first described, and are impelled in an upward direction by the action of the springs 46. (To save space, the magnets are superposed in pairs, the upper magnets being provided with pressure pawls, and the lower magnets with traction pawls. Only one magnet, however, acts upon each of the rods 19). The upper ends of the rods 14 are forked, and in each of them a rotary locking lever 17 has its bearings, exactly as illustrated in Figs. 2 and 3. In this present mode of construction also, T rods 19 are mounted over the lower stops of the locking levers 17, and the said rods 19 are raised by the upward stroke of one of the said locking levers, and held thus raised, in an oblique position, in consequence of the turning of the locking lever, and under the action of springs 20. The raising of a second lever in the same row, whose upper step is directly under the rod 19, in consequence of the oblique position of the latter, causes an additional upward motion of the said rod 19, and the closing of the contact 22. As appears from the connection diagram Fig. 6, the closing of the said contact results in the opening of the automatic switch 25, inasmuch as current is sent into the magnet 26 when the contact 22 is closed. The motor 24 which operates both the adding machine and the stop motion, will consequently stop. The different operations are partly the same, in fact, as in the mode of construction for operating the device by mechanical means.

As long as the cards passing through the machine have the same group number, or rather the same perforation distinctive of the group, and therefore bear in this present instance the same workman's number, the same magnet 42 will be excited. Since the first attraction of the armature or pawl 45 caused the rod 14 to be raised and to be locked in its upper position by the locking lever 17, the subsequent closing of contacts through the same card perforation, by which the same magnet is cut in, will not cause any further motion of the raised rod 14, or of the T bar 19. Another rod 14 in the same row or series will only be raised and cause the previously described additional upward motion of the rod 19, when a change in the card perforation occurs, and current is sent into another contact piece 39 and into another magnet 42. When the change in the card perforation has caused the breaking of the circuit and the consequent stopping of the machine, all the parts are returned to their starting position by turning a handle 47. This is effected as follows:

When the handle 47 is turned, it will raise by means of a toothed gear, a rod 48, provided with two lugs or shoulders 49 and 50. During the upward stroke of the rod 48, the lug 50 will first draw a latticed frame 51 toward the outside, thereby setting in a vertical position all the locking levers that were turned in a slanting position. While continuing its upward stroke, the rod 48 subsequently draws a rod 52 toward the outside. This latter rod is in turn provided with lugs or shoulders 53 which return the rod 14 to its position of rest, thereby causing the pawls 45 to spring back into place. The machine is then in readiness for a further operation.

To provide a means for having any of the columns on the cards operate at will on the stop motion, a pair of contacts 34, 35 may either be provided for each column of figures, and the conductors 54, 55, Figs. 5, 6, may then be connected in each instance with the contacts for the required column, or else the contacts are so arranged that they can be shifted transverse to the direction in which the cards are fed through the machine, similarly as the rod 14, etc., in the first described mode of construction.

(Ad 2ª). *Solution of problems by mechanical means.*

In this mode of construction (Figs. 9, 10) the lower part is wholly similar to that described at 1ª; a pin case or frame having up and downward motion, and operated by grooved disks or pulleys, being consequently likewise provided. The cards are also separately fed from a card stack into the stop action, where they are retained for a definite period and subsequently conveyed to the adding or other machine indicated on the right side of the drawing.

The construction above the pin case or frame, however, is wholly different.

The upper part of the stop motion consists in a frame 56, on which a loose frame 57 is so mounted that it can be shifted and moved into place over each column on the cards. The frame 57 is inclosed on both sides by plates 58. A shaft 59 is passed through holes drilled in the center of the said plates. Strips 60, in the shape of arcs, of a circle, inclose the frame 57 at the bottom. Radially extending stop pins are passed through the said strips, and rods 62 are mounted with articulated joints on the lower end of the said stop pins. By means of intermediate pins 63, the rods 62 are raised by one of the spring pins 18, mounted in the frame 5 (having vertical reciprocating motion), whenever there is a perforation in the corresponding vertical columns of figures on the cards. The drawing shows three rows of ten pins each, and changes in the perforations of three figure columns can consequently be controlled. Three systems of shears are mounted on the shaft 59, each of these systems being composed of two similar shear blades 64. Two spreading bars 65 for each pair of shears are rotary mounted on the upper end of the shear blades, the said spreading bars being connected at their upper ends by a joint pin, on which is set a small roller 66. A two-arm lever, whose arms are indicated by 67 and 68, is mounted between the shear 64. The hub of this lever is provided with a lug 69, against which pins 70 strike, when the shears are closed, one of the said pins being attached to one of the shear blades, and the other pin to the other shear blade. A spring 71 impels the shears to close, but a slide block 72 prevents them from closing. The said slide block is guided in the frame 57 and an up and down motion is imparted to it by a grooved disk or pulley 73, mounted on the main shaft 12. This motion is transmitted by means of an angle lever 74, having its bearing on a pin 75, and carrying a roller 76 which revolves in a curve groove of the disk or pulley 73. A rod 77 is mounted by articulated joint on the angle lever, and transmits the motion of the same to two two-armed levers 78 carrying a horizontal rod 79. The slide block 72 is suspended from a link 80, sliding on the rod 79. The lever arm 68 carries on its outer end a toothed arc 81, against the teeth of which a pawl 82 is forced, under the action of a spring 83. A contact 84 is mounted near the pawl 82, in such manner that the latter will break the contact whenever the pawl is turned by the teeth of the toothed arc 81. The arm 67 carries on the outside an arc 85, on which appear the figures 0 to 9, one of these figures being visible at any time through the window 86. This figure indicates the position of the arc 85, or rather of the shears 64, and therefore also the position of the effective card perforation, *i. e.* the number of the group to which the card belongs. As long as cards having the same group numbers are passed through the stop motion, the same stops 61 will always be raised. When the stop 61 has attained its upper position, the slide block 72 will likewise be raised, and the system of shears moves from the position in which the blades are spread out or open, as indicated in the drawing in stippled lines, into the closed position, under the action of the spring 71, this closing of the shear system being effected at a speed corresponding to that of the motion of the slide block 72. As the system of shears is rotary and carries at its upper end the roller 66, it is capable of moving into any position determined by the stops 61. If the same stop pin is raised several times in succession, the shears will return an equal number of times into their final position. During this operation, the pins 70, attached to the two shear parts, will turn the lever 67, 68 into a predetermined position, in which it remains as long as the cards passing through have the same group number. The opening of the shears after each operation is effected by the pressure exerted upon the system of shears by the slide block 72, on its downward stroke. The stop 61 returns simultaneously into its position of rest, in consequence of the lowering of the pin frame or case 5.

When cards belonging to a new group are passing through the stop motion, other stops 61 are raised. Each pair of shears will then close around another stop 61, thereby naturally assuming a different position, with the result that one of the pins 70 will carry along the lug or shoulder 69 over a corresponding distance, thereby turning the lever 67, 68. This motion will cause the pawl 82 to turn, thereby breaking the contact 84. Since the said contact is in the circuit of the automatic circuit breaker, the motor circuit will be broken whenever the system of shears assumes a different position, i. e. whenever there is a change in the card perforation.

(Ad 2b). *Solution of problem by electricity.*

Fig. 11 is a diagram showing the general arrangement. In this mode of construction also, the cards are taken separately from the card stack 1, and fed into the adding machine by pairs of rollers 2, 27 and 87. While being thus conveyed, the cards slide between a contact brush 34 and a contact 35, facing the said brush, contact being thereby made at different instants, depending on the distance between the perforation and the edge of the card. The device is also provided with an additional contact 88, made and broken by a cam disk, the said contact being made whenever the contact brush 34 bears upon the edge of a card that is being fed into the machine. Furthermore, the device is also provided with a relay 89 which extends the period during which the circuit is closed through the card perforation, until the card has passed through between the contacts 34, 35, at which time the contact 88 is broken with the result that the relay 89 returns to the position of rest. A magnet 90 is cut into one of the two circuits, and a magnet 91 into the other circuit. A field break switch 92 is switched into the same circuit as the magnet 91, and breaks the circuit of the magnet 90, whenever current flows through the magnet 91.

Figure 13:
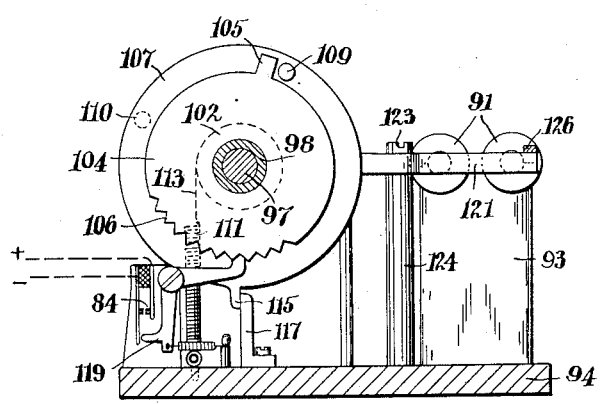
Fig. 13 is a section along the line 13—13 of Fig. 14.
Figure 14:
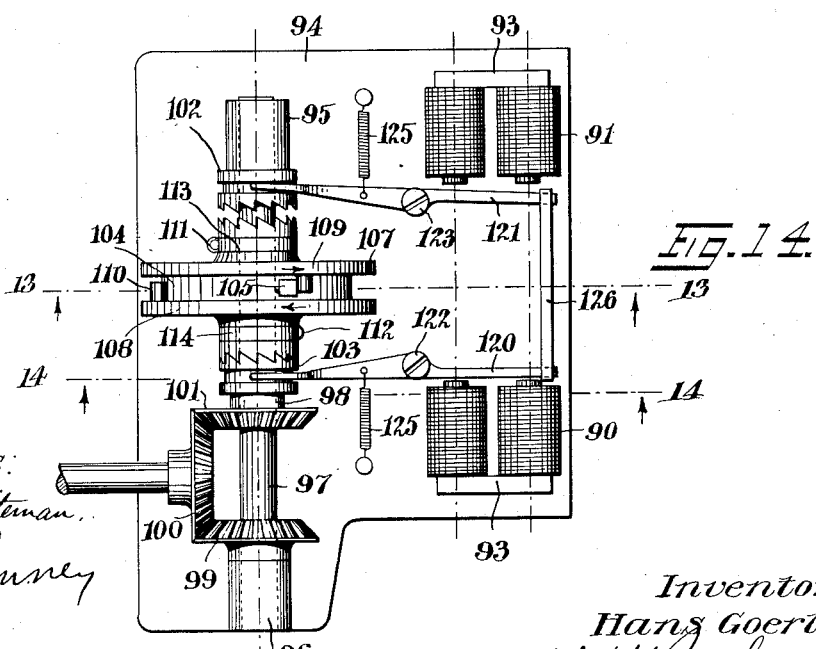
Fig. 14 is a plan view of part of the electrically actuated mechanism illustrated in Fig. 11.

The two magnets 90 and 91 are fastened by means of supports 93 on a bed plate 94 (Figs. 12-14), which also supports two bearing pedestals 95 and 96 for a shaft 97, inclosed in a hollow shaft 98. By means of a system of bevel gears 99, 100, 101, in which the gear 100 is the driving gear, the shaft 97 is revolved in the direction from left to right, and the hollow shaft 98 in the direction from right to left. A coupling sleeve 102 is so mounted on the inner shaft 97 that it can slide in its axial direction, but not revolve on the same, while a coupling sleeve 103 is mounted on the outer shaft 98, on which it can likewise slide. Both coupling sleeves are provided with a locking gear, but for opposite directions of revolution. A disk 104, having a lug 105, is mounted on the center of the shaft. On the face opposite the lug 105, the said disk has 10 teeth 106. On either side of the disk 104 are mounted disks 107, 108, provided with pins 109, 110 which coöperate with the lug 105. Spiral springs 111, 112 are fastened with one of their ends to steel bands 113 and 114 respectively, which bands are bent over one-half of the circumference of the hub of the disks 107, 108 and exert an effort to maintain the disks in their position of rest which is determined by stops 115, 116, attached to the disks, and by stationary stops 117, 118. Pressure is exerted against the teeth 106 by a pawl 119, in the shape of an angle lever, and the contact 84 is broken by the turning of the said pawl. Each of the magnets 90 and 91 is provided with an armature 120, 121, made in the form of a two armed lever. These armatures are rotary mounted on pins 122, 123, provided on the supports 124. One end of the lever armatures is forked and engages grooves in the coupling sleeves 102 and 103. Springs 125 exert an effort to withdraw the armatures from the magnets.

All parts of the system of shafts is made to revolve synchronically with the card feed motion. Whenever the edge of a card enters under the brush 34, the contact 88 is made and the current is sent into the magnet 90. Its armature 120 is attracted, and the teeth of the coupling sleeve 103, which revolves at the same speed as the shaft 98, engage the toothed gear of the disk 108, and revolves the same until the current in the magnet 90 is switched off and the parts are disengaged by the traction of the spring 125.

The circuit is broken whenever the contact brush 34 strikes a perforation and thereby closes the circuit of the magnet 91 and of the field break switch 92. This is due to the fact that whenever the field break switch 92 breaks the circuit of the magnet 90, the simultaneously excited magnet 91 will engage the coupling sleeve 102, whose direction of revolution is opposite to that of the coupling sleeve 103, and the disk 107 will consequently be carried along, until the contact 88 cuts off the current. The other spring 125 thereupon disengages the coupling sleeve 102 and the disk 107. For the purpose of insuring the alternate coupling of the disks, the armatures 120, 121 are also connected by a strap 126, so dimensioned that it will pull off or detach one of the armatures, whenever the other armature is attracted.

The above described connecting system therefore causes the disks 107 and 108 to revolve alternately in opposite directions while the extent of such revolutions corresponds to the periods during which the two circuits remain closed. Moreover, the two disks restrict the lug 105, by means of the pins 109 and 110, to a distinctive position of rest for any determinate position of the card perforation, with the result that the disk 104 will only revolve when there are changes in the card perforation, and consequently likewise changes in the periods during which the two circuits remain closed. As long as both circuits remain closed during the same periods as in the preceding operations of the machine, the pins 109 and 110 will only be moved until they are in touch with the lug 105. On the other hand, if one of the circuits remains closed during a longer period, one of the disks will revolve over a greater distance, and the disk 104 will be turned to a corresponding extent. Each turn of disk results in a motion of the angle lever 119, and in the breaking of the contact 84, and as the said contact is in the circuit of the circuit breaker, the motor will be cut off and the stop motion as well as the adding machine are stopped. The springs 111 and 112 return the disks 107 and 108 to their starting position.

This solution of the problem likewise allows of handling any column on the cards at will, as the brushes need merely be set on the column to be handled. If a card column with numbers of three figures is to be handled, the complete device must be provided in triplicate. In this present mode of construction, equally well as in the one previously described (Ad 2ª), the disk 104 may be combined with an indicator segment visibly indicating the number of the group to which the cards belong. Moreover, an adequately devised indicator might likewise be applied to the two modes of construction first described.

(*Ad 3ª*). *Solution of problem by mechanical means.*

With respect to all the material structural parts, the arrangement is exactly similar to that shown in Figs. 9 and 10. In this present mode of construction also, stops 61 are provided (Fig. 15), the said stops being guided in arched parts 60 and raised whenever a spring pin passes through a perforation in the card. However, this present mode of construction is fundamentally different in so far as the stops 61 perform no up and down motions in unison with the operations of the machine, but lock themselves automatically in their upper positions, by means of a pawl 126', upon which a spring exerts a lateral effort. This present construction also provides a system of shears, having the shear blades 64 and the spreading bars 65, which system closes around the raised stop, exactly as shown in Figs. 9 and 10. The pressure of a slide block 72 also forces the shears apart at each operation.

Whenever there is a change in the card perforation, a second stop is lifted, in addition to the one previously raised, with the result that the shears will no longer close, but remain partly open. The difference between the intermediate position of the shears in their closed and in their open position is utilized for stopping the machine. This is effected as follows:

One of the shear blades 64 is provided with a conducting, metallic mounting or covering 127, so screwed on as to be insulated, and with an immediately adjoining, short insulating piece 128. The other shear blade is provided with a sliding contact 129. The insulating piece 128 and the metal strip 127 are so dimensioned that the sliding contact 129 will rest on the insulating piece when the shears are closed, and on the metal strip when the shears are open. The metal strip and the contact 129 are connected with an electric conductor 130. Switched into the same conductor is a push contact 131, through which contact is made when the slide block 72 is at the end of its upward stroke, i. e. when the shears have moved into their final position. No current can pass through when the shears are closed, because the sliding contact 129 will then rest upon the insulating piece 128. The raising of a second stop 61 will prevent the shears from closing, and the sliding contact 129 will consequently rest on the conducting metal mounting or covering 127, with the result that current can pass through as soon as contact is likewise made through 131, when the slide block 72 arrives at the end of its upward stroke. The circuit closing thus effected is utilized in the manner previously described, for operating an automatic contact breaker. If multiple systems of shears are provided in juxtaposition, the electric conductors are connected in parallel, and only one switch 131 is cut into the joint feed or return line. To provide a means for returning the pawls 126 of the stops 61 to their position of rest, a grid shaped frame 142 that can be shifted to the right by operating the handle 143, is mounted over the bridge 60. When the pawls 126' have returned to their position of rest, the stops 61 and the rods 62 drop back into their lower position by their own weight.

(*Ad 3ᵇ*). *Solution of problem by electricity.*

These methods of solving the problem are mostly combinations of those illustrated in Figs. 5—6—7—8 and 15. In this present instance, the stops for the system of shears are not raised by spring pins (Figs. 16, 17), but released by magnets, as shown in Figs. 7 and 8. In the mode of construction shown in Fig. 16, the current for the automatic circuit breaker is cut in and out similarly as in the mode of construction shown in Fig. 15.

In the device shown in Fig. 17, on the other hand, the difference in the positions of the shear blades with respect to each other when the shears are open and closed, is utilized by mechanical means for shutting off the operating power. An angle lever 133 that can turn on a pin 132, is mounted on one of the shear blades 64, and forced by the action of a spring 133' against the other shear blade, provided with a lug 135. When the shears are closed, the said angle lever is in the position shown in Fig. 17, but when the shears are open it will slide from the lug 135 and is shifted over a certain distance toward the right, by the traction of the spring 133'. This turning motion of the angle lever 133 is transmitted by a movable cable 134, in the manner somewhat similar to the transmission method used in photographic apparatus for operating the shutter for the objective. The cable tube is fastened to one of the shear blades at the point 134', while the steel wire of the cable is attached to the angle lever 133. A two arm lever 136, having its fulcrum at the point 137, will turn under the traction exerted by the said cable. A small bar 138 is rotary mounted on the lower end of the said double lever 136, and shifted in the direction toward the left, when the latter turn toward the right. This shifting motion causes the head 139 of the bar 138 to enter into the path of the slide block 72, and the bar 138 thus transmits the final part of the motion of the said block to a vertical rod 140, connected by an articulated joint with a double lever 141 which may in turn be connected with disconnecting parts of known construction.

The disconnecting motion effected by the above described method is thoroughly reliable and powerful, being derived from the slide block 72 which is under a powerful impulse. The system of shears is merely provided for the purpose of inserting a coupling member into the direction of motion of superior force.

It is obvious that various changes and modifications may be made to the details of construction without departing from the general spirit of the invention.

I claim:

1. In combination with the drive of an adding or sorting machine, of a stop action coöperating with perforated cards comprising means for coöperating with the perforations in a card, a drive controlling member adapted to be actuated into a certain position by said means when said means coöperate with a certain perforation, said controlling member assuming another position when said means coöperate with another perforation, and connecting means for operatively connecting said controlling member with said drive, said change in position in said controlling member disconnecting said drive with the result that the machine stops whenever a new group or series of cards commences, or when the supply of cards is exhausted.

2. In combination with the drive of an adding or sorting machine, of a stop action coöperating with perforated cards comprising pins for coöperating with the perforations in a card, a drive controlling member adapted to be set in a certain position by any one of said pins when one of said pins coöperates with a certain perforation, said controlling member assuming another position when another of said pins coöperates with another perforation, and connecting means for operatively connecting said controlling member with said drive, said change in position in said controlling member disconnecting said drive with the result that the machine stops whenever a group or series of cards commences.

3. In combination with the drive of an adding or sorting machine, of a stop action coöperating with perforating cards comprising a predetermined series of pins for coöperating with certain of the perforations in a card, a drive controlling member adapted to be set in a certain position by any one of said pins when such pin coöperates with a certain perforation, said controlling member assuming another position when another of said pins coöperates with another perforation, and connecting means for operatively controlling said connecting member with said drive, said change in position in said controlling member disconnecting said drive with the result that the machine stops whenever a new group or series of cards commences.

4. In combination with the drive of an adding or sorting machine, of a stop action coöperating with perforating cards comprising a predetermined series of pins for coöperating with certain of the perforations in a card, a drive controlling member to be differently actuated by successively operative different pins when such pins coöperate with certain perforations, said change in actuation disconnecting said drive.

5. In combination with the drive of an adding or sorting machine, of a stop action coöperating with perforated cards comprising means for coöperating with the perforations in a card, a drive controlling member to be differently actuated by said coöperating means when such coöperating means successively coöperate with different perforations, said change in actuation disconnecting said drive.

6. In combination with the drive of an adding or sorting machine, of a stop action comprising a settable member adapted to be set according to and by the perforations of a certain series of cards, said settable member assuming another position when actuated by the perforations of another series of cards, and connecting means for connecting said settable member with said drive so that upon being actuated by the perforations of such other series of cards, the drive will be disconnected with the result that the machine thereupon stops.

7. In combination with the drive of an adding or sorting machine having a pin box reciprocatably mounted, pins operatively mounted in said pin box and adapted to analyze a perforated card, of a stop action having a plurality of settable pins adapted to be actuated by those pins of said pin box which find perforations and pass therethrough, and disconnecting means adapted to disconnect said drive, said disconnecting means being initially set into one position when the pins of one series of perforations are actuated, said disconnecting means being moved into a second position when the pins of another series of perforations are actuated, said change in position in said disconnecting means disconnecting said drive with the result that the machine thereupon stops.

8. In combination with the drive of an adding or sorting machine, of a stop action coöperating with perforated cards and comprising pins coöperating with the perforations in a card, a plurality of pairs of rotary shears, each pair of rotary shears having two coöperating arms, stops operatively connected to said pins and adapted to be actuated into the path of movement of and between said coöperating arms whenever a certain series of pins find perforations in a card, a disconnecting means adapted to disconnect said drive, said disconnecting means being initially set into one position by said shears when the pins of one series of perforations are actuated, said disconnecting means being moved into a second position by said shears when the pins of another series of perforations are actuated, said change in position in said disconnecting means disconnecting said drive with the result that the machine thereupon stops.

9. In combination with the drive of an adding or sorting machine, of a stop action coöperating with perforated cards and comprising pins coöperating with the perforations in a card, a plurality of pairs of rotary shears, each pair of rotary shears having two coöperating arms, stops operatively connected to said pins and adapted to be actuated into the path of movement of and between said arms whenever a certain series of pins find perforations in a card, a disconnecting means adapted to disconnect said drive, said disconnecting means being initially set into one position by said shears when the pins of one series of perforations are actuated, the further actuation of pins by the same series of perforations being ineffective to change the position of said disconnecting means, said disconnecting means being moved into a second position by said shears when the pins of another series of perforations are actuated, said change in position in said disconnecting means disconnecting said drive with the result that the machine thereupon stops.

10. In combination with the drive of an adding or sorting machine, of a stop action coöperating with perforated cards and comprising pins coöperating with the perforations in a card, a shaft, a plurality of pairs of rotary shears mounted on said shaft, each pair of rotary shears having two stop-coöperating arms, stops operatively connected to said pins and adapted to be actuated into the path of movement of and between said stop coöperating arms whenever a certain series of pins find perforations in a card, each pair of rotary shears also having two extensions on the ends opposite to the arms, a link pivotally connected to each extension, rollers each connecting the two links of a pair of shears, a spring connecting each two extensions to normally press the extensions toward one another, a slideway, a slide-block in said slideway coöperating with said rollers and adapted to exercise a pressure on the same thereby to spread said extensions apart and simultaneously spread said stop-coöperating arms apart, means for normally maintaining said slide-block in lower position wherein it spreads said coöperating arms apart and permits said slideway to be raised whenever a series of stops are actuated thereby permitting said springs to contact said arms to engage actuated stops, levers each having two arms pivotally connected to said shaft, one lever disposed between each pair of rotary shears, a lug on each of such levers, pins on each pair of shears coöperating with such lug whereby each lever will be positioned by a pair of shears when they are actuated to engage a stop, a toothed arc on one arm of each lever, a pawl coöperating with each toothed arc, and a switch controlling said drive and adapted to be disconnected by said pawl whenever it is actuated by said arc so that when the arc is actuated by a change of position in said lever due to said shears, the switch will be disconnected and thereby the drive disconnected to stop the operation of the machine.

11. In combination with the drive of an adding or sorting machine, of a stop action coöperating with perforated cards and comprising pins coöperating with the perforations in a card, a shaft, a plurality of pairs of rotary shears mounted on said shaft, each pair of rotary shears having two stop-coöperating arms, stops operatively connected to said pins and adapted to be actuated into the path of movement of and between said stop-coöperating arms whenever a certain series of pins find perforations in a card, each pair of rotary shears also having two extensions on the ends opposite to the arms, a link pivotally connected to each extension, rollers each connecting the two links of a pair of shears, a spring connecting each two extensions to normally press the extensions toward one another, actuating means for exercising pressure on said roller thereby to spread said extensions apart and simultaneously to spread said coöperating arms apart, controlling means for normally maintaining said actuating means in lower position wherein it spreads said coöperating means apart and permits the actuating means to be raised whenever a series of stops are actuated thereby permitting said springs to contract said arms to engage actuated stops, levers having two arms pivotally connected to said shaft, one lever disposed between each pair of rotary shears, a lug on each of such levers, pins on each pair of shears coöperating with such lug whereby each lever will be positioned by a pair of shears when they are actuated to engage a stop, a toothed arc on one arm of each lever, a pawl coöperating with each toothed arc, and a switch controlling said drive and adapted to be disconnected by said pawl whenever it is actuated by said arc so that when the arc is actuated by a change of position in said lever due to said shears, the switch will be disconnected and thereby the drive disconnected to stop the operation of the machine.

12. In combination with the drive of an adding or sorting machine, of a stop action coöperating with perforated cards and comprising pins coöperating with the perforations in a card, a shaft, a plurality of pairs of rotary shears mounted on said shaft, each pair of rotary shears having two stop-coöperating arms, stops operatively connected to said pins and adapted to be actuated into the path of movement of and between said coöperating arms whenever a certain series of pins find perforations in a card, each pair of rotary shears also having two extensions on the ends opposite to the arms, a link pivotally connected to each extension, rollers each connecting the two links of a pair of shears, a spring connecting each two extensions to normally press the extensions toward one another, a slideway, a slide-block in said slideway coöperating with said rollers and adapted to exercise a pressure on the same thereby to spread said extensions apart and simultaneously spread said stop-coöperating arms apart, means for normally maintaining said slide-block in lower position wherein it spreads said coöperating arms apart and permits said slideway to be raised whenever a series of stops are actuated thereby permitting said springs to contract said arms to engage actuated stops, and disconnecting means adapted to disconnect said drive, said disconnecting means being initially set into one position by said shears when the pins of one series of perforations are actuated, the further actuation of pins by the same series of perforations being ineffective to change the position of said disconnecting means, said disconnecting means being moved into a second position by said shears when the pins of another series of perforations are actuated, said change in position in said disconnecting means disconnecting said drive with the result that the machine thereupon stops.

13. In combination with the drive of an adding or sorting machine, of a stop action coöperating with perforated cards and comprising pins coöperating with the perforations in a card, a shaft, a plurality of pairs of rotary shears mounted on said shaft, each pair of rotary shears having two stop-coöperating arms, stops operatively connected to said pins and adapted to be actuated into the path of movement of and between said stop-coöperating arms whenever a certain series of pins find perforations in a card, each pair of rotary shears also having two extensions on the ends opposite to the arms, a link pivotally connected to each extension, rollers each connecting the two links of a pair of shears, a spring connecting each two extensions to normally press the extensions toward one another, actuating means for exercising pressure on said roller thereby to spread said extensions apart and simultaneously to spread said coöperating arms apart, controlling means for normally maintaining said actuating means in lower position wherein it spreads said coöperating means apart and permits the actuating means to be raised whenever a series of stops are actuated thereby permitting said springs to contract said arms to engage actuated stops, and disconnecting means adapted to disconnect said drive, said disconnecting means being initially set into one position by said shears when the pins of one series of perforations are actuated, the further actuation of pins by the same series of perforations being ineffective to change the position of said disconnecting means, said disconnecting means being moved into a second position by said shears when the pins of another series of perforations are actuated, said change in position in said disconnecting means disconnecting said drive with the result that the machine thereupon stops.

14. In combination with the drive of an adding or sorting machine, of a stop action coöperating with perforated cards and comprising pins coöperating with the perforations in a card, a shaft, a plurality of pairs of rotary shears mounted on said shaft, each pair of rotary shears having two stop-coöperating arms, stops operatively connected to said pins and adapted to be actuated into the path of movement of and between said stop-coöperating arms whenever a certain series of pins find perforations in a card, each pair of rotary shears also having two extensions on the ends opposite to the arms, a link pivotally connected to each extension, rollers each connecting the two links of a pair of shears, a spring connecting each two extensions to normally press the extensions toward one another, a slideway, a slide-block in said slideway coöperating with said rollers and adapted to exercise a pressure on the same thereby to spread said extensions apart and simultaneously spread said stop-coöperating arms apart, means for normally maintaining said slide-block in lower position wherein it spreads said coöperating arms apart and permits said slideway to be raised whenever a series of stops are actuated thereby permitting said springs to contract said arms to engage actuated stops, levers each having two arms pivotally connected to said shaft, one lever disposed between each pair of rotary shears, a lug on each of such levers, pins on each pair of shears coöperating with such lug whereby each lever will be positioned by a pair of shears when they are actuated to engage a stop, a toothed arc on one arm of each lever, a pawl coöperating with each toothed arc, a switch controlling said drive and adapted to be disconnected by said pawl whenever it is actuated by said arc so that when the arc is actuated by a change of position in said lever due to said shears, the switch will be disconnected and thereby the drive disconnected to stop the operation of the machine, and an arc on each of the other arms of said levers, there being numerals marked on such arc, a housing inclosing said levers, there being an opening disposed adjacent to the path of movement of said arcs and large enough to permit but a single row of numerals to be exposed at one time, the arrangement being such that the numerals exposed will indicate the positions of the levers and therefore the classifying numerals of the series of cards being sorted.

HANS GOERLITZ.

Witnesses:
  HENRY HASPER,
  WOLDEMAR HAUPT.